US008868429B2

(12) United States Patent
Sun et al.

(10) Patent No.: US 8,868,429 B2
(45) Date of Patent: Oct. 21, 2014

(54) METHOD AND DEVICE FOR STORING AUDIO DATA

(75) Inventors: Jian Sun, Shenzhen (CN); Jiazhou Li, Shenzhen (CN); Yaping Ruan, Shenzhen (CN); Ya Lin, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 267 days.

(21) Appl. No.: 13/640,578

(22) PCT Filed: Oct. 26, 2010

(86) PCT No.: PCT/CN2010/078117
§ 371 (c)(1),
(2), (4) Date: Nov. 2, 2012

(87) PCT Pub. No.: WO2011/127726
PCT Pub. Date: Oct. 20, 2011

(65) Prior Publication Data
US 2014/0149123 A1   May 29, 2014

(30) Foreign Application Priority Data

Apr. 14, 2010  (CN) .......................... 2010 1 0165733

(51) Int. Cl.
*G10L 21/00*   (2013.01)
(52) U.S. Cl.
USPC ......................................... 704/275; 386/247
(58) Field of Classification Search
USPC ......................................... 704/201; 386/247
See application file for complete search history.

(56) References Cited

U.S. PATENT DOCUMENTS 8,320,733 B2 * 11/2012 Eckleder et al. .............. 386/232
8,321,228 B2 * 11/2012 Chipchase et al. ............ 704/275
2008/0292285 A1 * 11/2008 Fujinami et al. .............. 386/126

OTHER PUBLICATIONS

Digital cellular telecommunications system (Phase 2+); Universal Mobile Telecommunications System (UMTS); LTE; Transparent end-to-end packet switched streaming service (PSS); 3GPP file format (3GP); (3GPP TS 26.244 version 9.1.0 Release 9; Apr. 2010; XP014046630; See pp. 1-56.

* cited by examiner

*Primary Examiner* — Daniel D Abebe
(74) *Attorney, Agent, or Firm* — Ling Wu; Stephen Yang; Ling and Yang Intellectual Property

(57) ABSTRACT

A method for storing audio data is disclosed, including: recording basic information of a versatile audio data storage file into the versatile audio data storage file; storing Versatile Audio Codec (VAC) frame data into the versatile audio data storage file sequentially; recording payload information of the versatile audio data storage file into the versatile audio data storage file; and recording index information of VAC frames stored in the versatile audio data storage file into the versatile audio data storage file. A device for storing the audio data is also disclosed, including: a basic information record module, a VAC frame data storage module, a payload information record module and an index information record module. The file generated with this method is simple and is easy to read and access, which can be applied to various applications of the versatile audio frequently.

17 Claims, 3 Drawing Sheets

METHOD AND DEVICE FOR STORING AUDIO DATA

TECHNICAL FIELD

The present invention relates to the field of multimedia communication and transmission, and particularly, to a method and device for storing audio data.

BACKGROUND OF THE RELATED ART

In the field of multimedia communication, audio communication is always the dominated communication way. Since the disparity between terminal devices of the two parties of communication and the actual conditions of communication links are in a tremendous difference, the existing audio coding and decoding mode can not provide excellent audio services for all users.

Currently, a scheme of Versatile Audio Codec (VAC) is disclosed. In the scheme, the control method and the signal classification method are combined, which can implement coding, transmission and decoding for audio frames flexibly in accordance with different technical schemes according to information such as user setting, application scenarios, client feedback and audio data and so on. In addition, multiple codecs also can be included, which can support a scalable audio coding and decoding function from the narrow band to full band.

However, in the applications such as call recording and audio/video recording and so on, the audio data need to be stored in physical mediums for the purpose of subsequent accessing and viewing. Moreover, storing the audio data in the physical mediums also can make the users acquire file information conveniently and perform various access operations effectively and rapidly.

Therefore, a method for storing is required urgently to organize reasonably the storage structure and information of versatile audio data.

SUMMARY OF THE INVENTION

The technical problem required to be solved by the present invention is to provide a method and device for storing audio data, which can organize the storage structure and information of versatile audio data reasonably.

In order to solve the above technical problem, the present invention provides a method for storing audio data, which comprises:

recording basic information of a versatile audio data storage file into the versatile audio data storage file;

sequentially storing Versatile Audio Codec (VAC) frame data into the versatile audio data storage file;

recording payload information of the versatile audio data storage file into the versatile audio data storage file; and recording index information of VAC frames stored in the versatile audio data storage file into the versatile audio data storage file.

The basic information comprises one or more of the following information: a file type, a type version, characteristic information, a manufacturer logo and a creation time;

the characteristic information comprises one or more of the following information: configuration information, grading information, option information and attribute information.

The payload information comprises one or more of the following information: a total duration of file, a total number of stored VAC frames, a coding module identifier, an average bit rate of VAC coding stream and the characteristic information appeared in the stored VAC frames.

In the step of sequentially storing VAC frame data, one or more of the total number of the stored VAC frames, the coding module identifier, a total size of VAC frame data and the characteristic information appeared in the stored VAC frames are recorded;

the step of recording payload information comprises: calculating the total duration of file and the average bit rate of VAC coding stream, and recording one or more of the total duration of file, the total number of stored VAC frames, the coding module identifier, the average bit rate of VAC coding stream and the characteristic information appeared in the stored VAC frames into the versatile audio data storage file.

Before the step of sequentially storing VAC frame data, the method further comprises: dividing all the VAC frames stored in the versatile audio data storage file into one or more blocks logically; the block consists of a fixed number of the VAC frames;

the payload information further comprises: the number of the VAC frames contained in one block;

the index information comprises: block indexes of all the blocks in the versatile audio data storage file.

The block indexes comprise: block offset information of the current block.

The block indexes further comprise: the characteristic information of all the VAC frames in the current block.

In the step of sequentially storing VAC frame data, the characteristic information of each VAC frame and offset information of each block are recorded;

In the step of recording payload information, the number of the VAC frames contained in one block is recorded into the versatile audio data storage file;

In the step of recording index information, the block offset information of the current block and the characteristic information of all the VAC frames contained in the current block are recorded sequentially into the block index of each block, and block indexes of all the stored blocks are recorded into the versatile audio data storage file.

In order to solve the above technical problem, the present invention further provides a device for storing audio data, which comprises: a basic information record module, a VAC frame data storage module, a payload information record module and an index information record module;

the basic information record module is configured to: record basic information of a versatile audio data storage file into the versatile audio data storage file;

the VAC frame data storage module is configured to: sequentially store VAC frame data into the versatile audio data storage file;

the payload information record module is configured to: record payload information of the versatile audio data storage file into the versatile audio data storage file; and the index information record module is configured to: record index information of VAC frames stored in the versatile audio data storage file into the versatile audio data storage file.

The basic information comprises one or more of the following information: a file type, a type version, characteristic information, a manufacturer logo and a creation time;

the characteristic information comprises one or more of the following information: configuration information, grading information, option information and attribute information.

The payload information comprises one or more of the following information: a total duration of file, a total number of stored VAC frames, a coding module identifier, an average bit rate of VAC coding stream and the characteristic information appeared in the stored VAC frames.

The VAC frame data storage module is further configured to: record one or more of the total number of the stored VAC frames, the coding module identifier, a total size of VAC frame data and the characteristic information appeared in the stored VAC frames;

the payload information record module is configured to record the payload information by the following way: calculating the total duration of file and the average bit rate of VAC coding stream, and recording one or more of the total duration of file, the total number of stored VAC frames, the coding module identifier, the average bit rate of VAC coding stream and the characteristic information appeared in the stored VAC frames into the versatile audio data storage file.

The device further comprises a block division module, the block division module is configured to: divide all the VAC frames stored in the versatile audio data storage file into one or more blocks logically; the block consists of a fixed number of the VAC frames;

the index information record module is further configured to: sequentially record block offset information of the current block and the characteristic information of all the VAC frames contained in the current block into a block index of each block, and take the block indexes of all the stored blocks as the index information to record into the versatile audio data storage file.

The block indexes comprise: the block offset information of the current block and/or the characteristic information of all the VAC frames in the current block.

The VAC frame data storage module is further configured to: record the characteristic information of each VAC frame and offset information of each block;

the payload information record module is further configured to: record the number of the VAC frames contained in one block into the versatile audio data storage file;

the index information record module is further configured to: sequentially record the block offset information of the current block and the characteristic information of all the VAC frames contained in the current block into the block index of each block, and record the block indexes of all the stored blocks into the versatile audio data storage file.

With the present invention, the basic information of the versatile audio data storage file, the VAC frame data, the payload information of the file and the index information of the VAC frames are recorded, which can implement a function of replaying the versatile audio data conveniently, acquire the file information efficiently, and implement positioning playing and graded playing.

PREFERRED EMBODIMENTS OF THE PRESENT INVENTION

Currently, with regard to the existing methods for storing audio coding data, such as Adaptive Multi-Rate (AMR), Advanced Audio Coding (AAC) and Moving Picture Experts Group (MPEG) Audio Layer3 (MP3) and so on, either no index exists, which can not implement positioning playback, or the index design is not reasonable enough, which can not describe characteristics of frame data well. Especially for the layered multi-rate code stream such as Versatile Audio Codec (VAC), in the existing methods for storing, it is required to traverse and read all the data, and then target data can be selected after parsing, which can not implement efficient code stream selection and graded playing.

With the present invention, the problem that the graded playing can not be implemented when versatile voice frames are stored in the related art can be solved.

The present invention will be described in detail in combination with the accompanying drawings and specific examples below.

Figure 1:
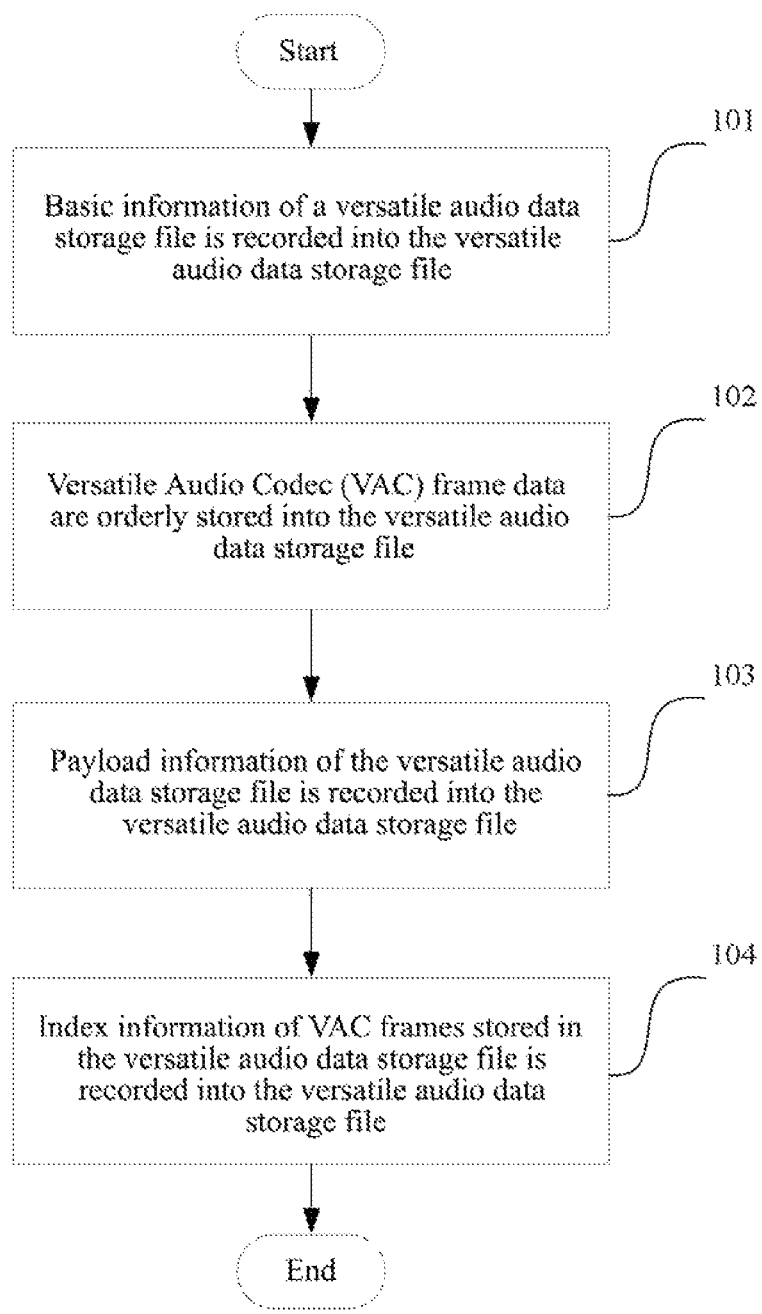
FIG. 1 is a flow diagram of a method for storing according to the example of the present invention.

As shown in FIG. 1, the method for storing audio data according to the example of the present invention includes the following steps.

In step 101, basic information of a versatile audio data storage file is recorded in the versatile audio data storage file.

The basic information provides overall description information of the current file, which can include one or more of the following information: a file type, a type version, characteristic information (profile), a manufacturer logo and a file creation time and so on.

In step 102, Versatile Audio Codec (VAC) frame data are sequentially stored in the versatile audio data storage file.

Specifically, the acquired VAC frames are sequentially stored in the file byte by byte.

Wherein, versatile audio data are precisely the VAC frame data.

In step 103, after the storage for all the VAC frame data is completed, payload information of the versatile audio data storage file is recorded in the versatile audio data storage file.

The payload information provides supplement description of the current file, which can include one or more of the following statistical information: a total duration of file, a total number of the VAC frames stored in the file and an average bit rate of VAC coding stream and so on.

Moreover, the payload information also can include: a coding module identifier and the characteristic information (i.e. a profile list) appeared in the VAC frames stored in the file.

In step 104, index information of the VAC frames stored in the versatile audio data storage file is recorded in the versatile audio data storage file.

In order to support the positioning drag when a media file is replayed, i.e. supporting a function of randomly accessing the VAC frames at the specified time point of the file conveniently and efficiently, it is required to record indexes of the VAC frames.

Furthermore, in order to enhance the indexing efficiency and reduces the index size, all the VAC frames sequentially stored in the file are divided into one or multiple blocks logically, and these blocks are indexed, that is, each frame entry records position offset information of a certain block.

Moreover, in order to perform selective reading and graded playing on graded multi-rate data, the characteristic information of each VAC frame can be recorded in the index information, thus, during the playback, it is not necessary to access the VAC frame data one by one, and the desired target data can be obtained just according to the guidance of the indexes.

Furthermore, the characteristic information (i.e. profile) of the VAC frames actually contained in each block is recorded in the indexes, so as to optimize the efficiency of operating the VAC frames inside the blocks, and implement convenient graded playback.

Wherein, the block consists of a fixed number of the VAC frames, a value of the number is defined in the payload information of the file, that is, the number of the VAC frames contained in one block is recorded in the versatile audio data storage file in the step 103. The parameter can be configured by itself when the file is generated.

The characteristic information of all the VAC frames contained in one block is recorded sequentially in an index of the block. When a user wants to select the code stream with a certain specific attribute, it can be searched by the index conveniently, which implements a graded playback function.

With reference to FIG. 2~FIG. 5, they are the examples of the storage contents in one versatile audio data storage file.

Figure 2:
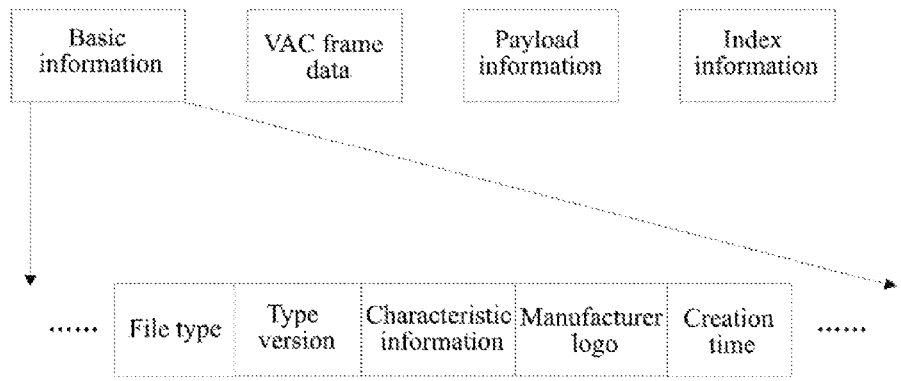
FIG. 2 is a schematic diagram of basic information of the storage file according to the present invention.

As shown in FIG. 2, one versatile audio data storage file can include: basic information of the file, VAC frame data, payload information of the file and index information of VAC frames. Wherein, the basic information can include a file type field, a type version field, a characteristic information (profile) field, a manufacturer logo field, a creation time field and other certain fields. The file type field identifies that the current file is formed of the storage of versatile audio data. The type version field identifies a type version of the current file. The characteristic information field identifies characteristic information of all the versatile audio data in the current file, which can include one or more of the following information: configuration information, grading information, option information and attribute information. The manufacturer logo field is used to identify a generator of the current file. The creation time field identifies the creation time of the current file.

Figure 3:
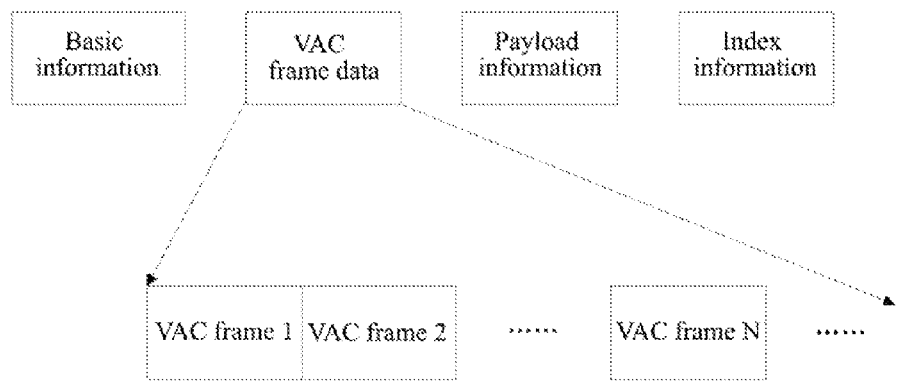
FIG. 3 is a schematic diagram of VAC frame data of the storage file according to the present invention.

As shown in FIG. 3, the VAC frame data consist of many VAC frames arranged in sequence.

Figure 4:
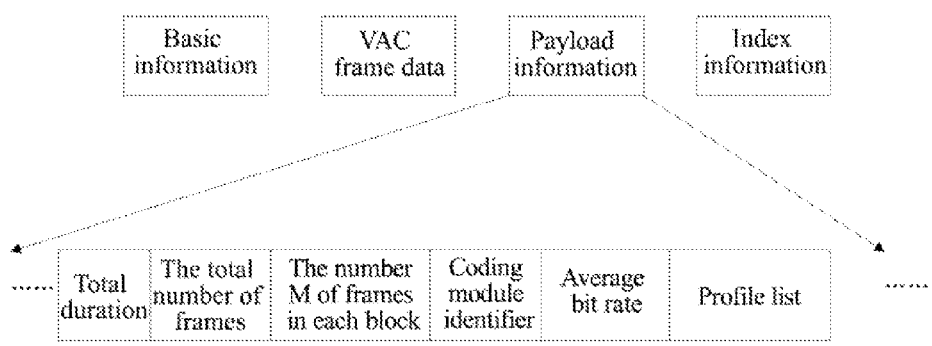
FIG. 4 is a schematic diagram of payload information of the storage file according to the present invention.

As shown in FIG. 4, the payload information can include a total duration field of the file, the total number of VAC frames of the file, the number of VAC frames contained in one block (i.e. the number M of frames of each block), an average bit rate of VAC coding stream, a coding module identifier field and the characteristic information (i.e. a profile list) appeared in VAC coding frames stored in the file. The total duration field of the file identifies the total length of time for replaying the entire file. A field of the total number of VAC frames of the file identifies the total number of VAC frames stored in the file. A field of the number of VAC frames contained in one block identifies the number of VAC frames in the block pointed by one entry in the indexes. The average bit rate of VAC coding stream identifies an average bit rate of the file. The coding module identifier field identifies the coding module identifiers appeared in the VAC coding frames stored in the file. A field of the profile list appeared in the VAC coding frames stored in the file identifies the characteristic information of all the VAC frames in the file, by which an accessor can choose whether to parse all or part of the file according to the own terminal characteristics.

Figure 5:
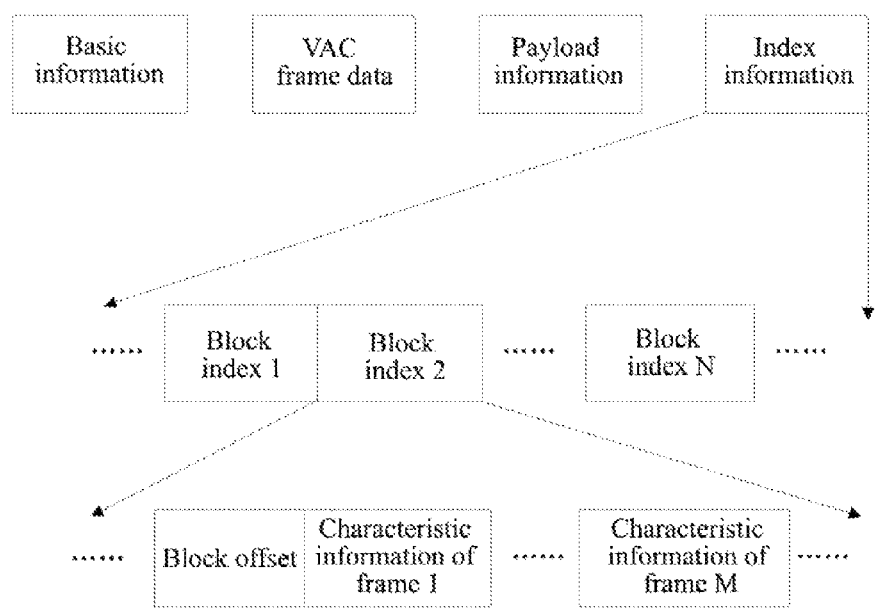
FIG. 5 is a schematic diagram of index information of VAC frames of the storage file according to the present invention.

As shown in FIG. 5, the index information of the file includes information of many block indexes arranged in sequence. The information of one block index includes a block offset field and a characteristic information field of all the VAC frames in the block. A block index field is used to perform positioning and random access according to time points in the file. The block offset field identifies the position offset of the positioned block in the file. The characteristic information fields of the VAC frames in one block are used to select the frame data of specific types in the block.

In conclusion, with reference to FIG. 1~FIG. 5, when the versatile audio data are stored, the basic information of the file is firstly written in, and then the VAC frame data are stored one by one. In the process, the total number of the stored VAC frames, the total size of the stored VAC frame data, the appeared characteristic information and the coding module identifier, the characteristic information of each VAC frame and the offset information of each block are recorded. After the storage of the frame data is finished, the total duration of the file and the average bit rate of VAC coding stream are calculated, and recorded in the payload information and written in the file. Finally, the index information is generated according to the characteristic information of each VAC frame and the offset information of the blocks, and written in the file.

Wherein, the step of generating the index information according to the characteristic information of each VAC frame and the offset information of the blocks and writing it into the file can be specifically: sequentially recording the block offset information of the current block and the characteristic information of all the VAC frames contained in the current block into the block index of each block, and recording the block indexes of all the stored blocks into the file.

The device for storing the audio data according to the example of the present invention includes: a basic information record module, a VAC frame data storage module, a payload information record module and an index information record module;

the basic information record module is configured to: record basic information of a versatile audio data storage file in the versatile audio data storage file;

the VAC frame data storage module is configured to: sequentially store VAC frame data in the versatile audio data storage file;

the payload information record module is configured to: record payload information of the versatile audio data storage file in the versatile audio data storage file; and the index information record module is configured to: record index information of VAC frames stored by the versatile audio data storage file in the versatile audio data storage file.

Furthermore, the device also includes a block division module, and the block division module is configured to: divide all the VAC frames stored in the versatile audio data storage file into one or multiple blocks logically; the block consists of a fixed number of the VAC frames;

the index information record module is further configured to: record block offset information of the current block and the characteristic information of all the VAC frames contained in the current block into a block index of each block in sequence, and take block indexes of all the stored blocks as the index information to record in the versatile audio data storage file.

The payload information record module is further configured to: record the total number of the stored VAC frames, the total size of the VAC frame data, the appeared characteristic information and the appeared coding module identifiers, calculate the total duration of file and the average bit rate of VAC coding stream, and record the total duration of the file, the total number of the stored VAC frames, the number of VAC frames contained in one block, the average bit rate of VAC coding stream and the characteristic information appeared in the stored VAC frames into the versatile audio data storage file.

The present invention will be further described through an application example below.

It is assumed that there is a group of versatile audio code streams, the characteristic information value is added by 1 for every 10 VAC frames in the group of versatile audio code streams sequentially, that is, characteristic information values of frames 1~10 are 1 s, characteristic information values of frames 11~20 are 2 s, . . . , and characteristic information values of frames 90~100 are 10 s. When the values are stored as the file, the basic information of the file is firstly written in, the file type is precisely the "VACFF", the file type version is 1.0, the characteristic information is 0xFF (that is, the characteristic information values of the stored VAC frames are not completely identical), the manufacturer logo is "ZTEMM", and the creation time is "20100322".

Wherein, a characteristic information field can be used to indicate whether the characteristic information of all the versatile audio data in the file is identical. For example, as mentioned above, when the characteristic information of the stored VAC frames is not completely identical, 0xFF (or different values of the other identification characteristic information) can be written in, and if the characteristic information of the stored VAC frames is completely identical, the value representing the same characteristic information can be written into the field. In addition, if it fails to acquire whether the characteristic information of the stored VAC frames is identical when the basic information of the file is written, a certain specified value such as 0xFF (or other specified values) also can be written in directly. At the point, 0xFF precisely indicates that whether the characteristic information of the stored VAC frames is completely identical can not be determined.

Then, the VAC frames are sequentially stored into the file and various kinds of information are recorded.

After the storage of the VAC frame data is finished, then the payload information is written in, the total duration is 20 ms (the duration of each VAC frame is 20 ms) *100=2000 ms, the total number of frames is 100, the number of frames in each block is 50 (data of 1 second form one block), and the average bit rate is $$\text{Sum}(\text{sizeof}(\text{VAC1}) + \text{sizeof}(\text{VAC2}) + \ldots + \text{sizeof}(\text{VAC100}))/2 \text{ bps}$$

wherein, sizeof(VAC) represents the bit number of the Nth VAC frame, Sum( ) represents adding the numbers in the bracket, and "/" represents division.

Then, the coding module identifier is written in, and if all the frames are generated by the same coding module, the field is recorded as 1.

Then, the characteristic information values 1, 2, 3, 4, 5, 6, 7, 8, 9, 10 appeared in this group of code streams are written in.

Finally, the index information is written in, if the offset of the first block in the file is 30, the index record of the block is 30, 1, 1, 1, 1, 1, 1, 1, 1, 1, 1 (the characteristic information values of the first 10 frames), 2, 2, 2, 2, 2, 2, 2, 2, 2, 2 (the characteristic information values of the second 10 frames), . . . 5, 5, 5, 5, 5, 5, 5, 5, 5, 5 (the characteristic information values of the fifth 10 frames).

With the index information of the block, the positioning of time points in the file can be implemented conveniently: if it needs to position the data at the $0.5^{th}$ second, and since the starting time of the first block is at the $0^{th}$ second and the starting time of the second block is at the first second, it is firstly positioned that the data required to be read are located in the first block, and then it is positioned to the 25th VAC frame. Through the offset position of the current block and the sum of lengths of the first 24 VAC frames, the offset position of the 25th VAC frame is calculated.

With the index information of the block, graded playback of the data also can be implemented conveniently: if a certain client can only play the data with a grade 2 for certain reasons, and discover that only the 10 frame information of the first block meets the requirements through the present index information, it only needs to read the corresponding data according to the indexes. At the point, it is not required to perform ergodic searching for the frame data in the file any more, which enhances reading efficiency greatly.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

Certainly, the present invention can still have other various examples. The skilled familiar to the art can make various corresponding changes and transformations according to the present invention without departing from the spirit and essence of the present invention, and these corresponding changes and transformations shall all fall into the protection scope of the appended claims of the present invention.

INDUSTRIAL APPLICABILITY

A method and device for storing versatile audio data are provided in the present invention. According to the present invention, basic information of the file, VAC frame data, payload information of the file and index information of VAC frames can be generated. The file structure generated with the method is simple and is easy to read and access, which can satisfy various applications of the versatile audio frequency.

What is claimed is:

1. A method for storing audio data, comprising:
   recording basic information of a versatile audio data storage file into the versatile audio data storage file;
   sequentially storing Versatile Audio Codec (VAC) frame data into the versatile audio data storage file;
   recording payload information of the versatile audio data storage file into the versatile audio data storage file; and
   recording index information of VAC frames stored in the versatile audio data storage file into the versatile audio data storage file.

2. The method according to claim 1, wherein,
   the basic information comprises one or more of the following information: a file type, a type version, characteristic information, a manufacturer logo and a creation time;
   the characteristic information comprises one or more of the following information: configuration information, grading information, option information and attribute information.

3. The method according to claim 2, wherein,
   the payload information comprises one or more of the following information: a total duration of file, a total number of stored VAC frames, a coding module identifier, an average bit rate of VAC coding stream and the characteristic information appeared in the stored VAC frames.

4. The method according to claim 1, wherein,
   the payload information comprises one or more of the following information: a total duration of file, a total number of stored VAC frames, a coding module identifier, an average bit rate of VAC coding stream and the characteristic information appeared in the stored VAC frames.

5. The method according to claim 4, wherein,
in the step of sequentially storing VAC frame data, one or more of the total number of the stored VAC frames, the coding module identifier, a total size of VAC frame data and the characteristic information appeared in the stored VAC frames are recorded;
the step of recording payload information comprises: calculating the total duration of file and the average bit rate of VAC coding stream, and recording one or more of the total duration of file, the total number of stored VAC frames, the coding module identifier, the average bit rate of VAC coding stream and the characteristic information appeared in the stored VAC frames into the versatile audio data storage file.

6. The method according to claim 4, wherein,
before the step of sequentially storing VAC frame data, the method further comprises: dividing all the VAC frames stored in the versatile audio data storage file into one or multiple blocks logically; the block consists of a fixed number of the VAC frames;
the payload information further comprises: the number of the VAC frames contained in one block;
the index information comprises: block indexes of all the blocks in the versatile audio data storage file.

7. The method according to claim 6, wherein, the block indexes comprise: block offset information of a current block.

8. The method according to claim 7, wherein,
the block indexes further comprise: the characteristic information of all the VAC frames in the current block.

9. The method according to claim 8, wherein,
In the step of sequentially storing VAC frame data, the characteristic information of each VAC frame and the offset information of each block are recorded;
In the step of recording payload information, the number of the VAC frames contained in one block is recorded into the versatile audio data storage file;
In the step of recording index information, the block offset information of the current block and the characteristic information of all the VAC frames contained in the current block are sequentially recorded into the block index of each block, and block indexes of all the stored blocks are recorded into the versatile audio data storage file.

10. A device for storing audio data, comprising: a basic information record module, a VAC frame data storage module, a payload information record module and an index information record module;
the basic information record module is configured to: record basic information of a versatile audio data storage file into the versatile audio data storage file;
the VAC frame data storage module is configured to: sequentially store VAC frame data into the versatile audio data storage file;
the payload information record module is configured to: record payload information of the versatile audio data storage file into the versatile audio data storage file; and
the index information record module is configured to: record index information of VAC frames stored in the versatile audio data storage file into the versatile audio data storage file.

11. The device according to claim 10, wherein,
the basic information comprises one or more of the following information: a file type, a type version, characteristic information, a manufacturer logo and a creation time; the characteristic information comprises one or more of the following information: configuration information, grading information, option information and attribute information.

12. The device according to claim 11, wherein, the payload information comprises one or more of the following information: a total duration of file, a total number of stored VAC frames, a coding module identifier, an average bit rate of VAC coding stream and the characteristic information appeared in the stored VAC frames.

13. The device according to claim 10, wherein,
the payload information comprises one or more of the following information: a total duration of file, a total number of stored VAC frames, a coding module identifier, an average bit rate of VAC coding stream and the characteristic information appeared in the stored VAC frames.

14. The device according to claim 13, wherein,
the VAC frame data storage module is further configured to: record one or more of the total number of the stored VAC frames, the coding module identifier, a total size of VAC frame data and the characteristic information appeared in the stored VAC frames;
the payload information record module is configured to record the payload information by the following way: calculating the total duration of file and the average bit rate of VAC coding stream, and recording one or more of the total duration of file, the total number of the stored VAC frames, the coding module identifier, the average bit rate of VAC coding stream and the characteristic information appeared in the stored VAC frames into the versatile audio data storage file.

15. The device according to claim 10, further comprising a block division module, wherein
the block division module is configured to: divide all the VAC frames stored in the versatile audio data storage file into one or multiple blocks logically; the block consists of a fixed number of the VAC frames;
the index information record module is further configured to: sequentially record block offset information of a current block and the characteristic information of all the VAC frames contained in the current block into a block index of each block, and take the block indexes of all the stored blocks as the index information to record into the versatile audio data storage file.

16. The device according to claim 15, wherein, the block indexes comprise: the block offset information of the current block and/or the characteristic information of all the VAC frames in the current block.

17. The device according to claim 16, wherein,
the VAC frame data storage module is further configured to: record the characteristic information of each VAC frame and the offset information of each block;
the payload information record module is further configured to: record the number of the VAC frames contained in one block into the versatile audio data storage file;
the index information record module is further configured to: sequentially record the block offset information of the current block and the characteristic information of all the VAC frames contained in the current block into the block index of each block, and record the block indexes of all the stored blocks into the versatile audio data storage file.

* * * * *